United States Patent [19]

Price et al.

[11] 3,795,155
[45] Mar. 5, 1974

[54] ANGULAR INDEXING APPARATUS FOR A MACHINE TOOL

[75] Inventors: Robert B. Price, Delanson; Richard N. Hosterman, Elnora; William G. Cook, Schenectady, all of N.Y.

[73] Assignee: Numicon, Inc., Delanson, N.Y.

[22] Filed: Oct. 22, 1971

[21] Appl. No.: 191,938

[52] U.S. Cl. .................................. 74/826, 74/813 C
[51] Int. Cl. ............................................ B23b 29/32
[58] Field of Search ........... 74/826, 813 C; 82/36 A; 318/601

[56] References Cited
UNITED STATES PATENTS

| | | | |
|---|---|---|---|
| 2,975,657 | 3/1961 | Samuel | 74/826 X |
| 3,464,292 | 9/1969 | Parsons et al. | 74/826 |
| 3,569,815 | 3/1971 | McNaughton | 318/601 |
| 3,572,194 | 3/1971 | Cafolla | 82/36 A |
| 3,573,589 | 4/1971 | Berry | 318/601 |
| 3,657,627 | 4/1972 | Inaba et al. | 318/601 |

Primary Examiner—Benjamin W. Wyche
Assistant Examiner—F. D. Shoemaker
Attorney, Agent, or Firm—Leonard H. King

[57] ABSTRACT

The angular indexing apparatus of the present invention is comprised of a multiple tooth face gear coupling pair, one section of which is rigidly secured to the spindle that supports the workpiece and the other section of which is axially slidable on the spindle, both into and out of engagement with the first, rotatable but non-axially movable section of the coupling. The spindle is rigidly supported by opposed bearings and cannot move in the axial direction. The spindle therefore is only capable of rotary motion. The indexing accuracy of the present invention is a function only of the grinding accuracy of the teeth formed on the opposed transverse surfaces of the coupling sections.

16 Claims, 6 Drawing Figures

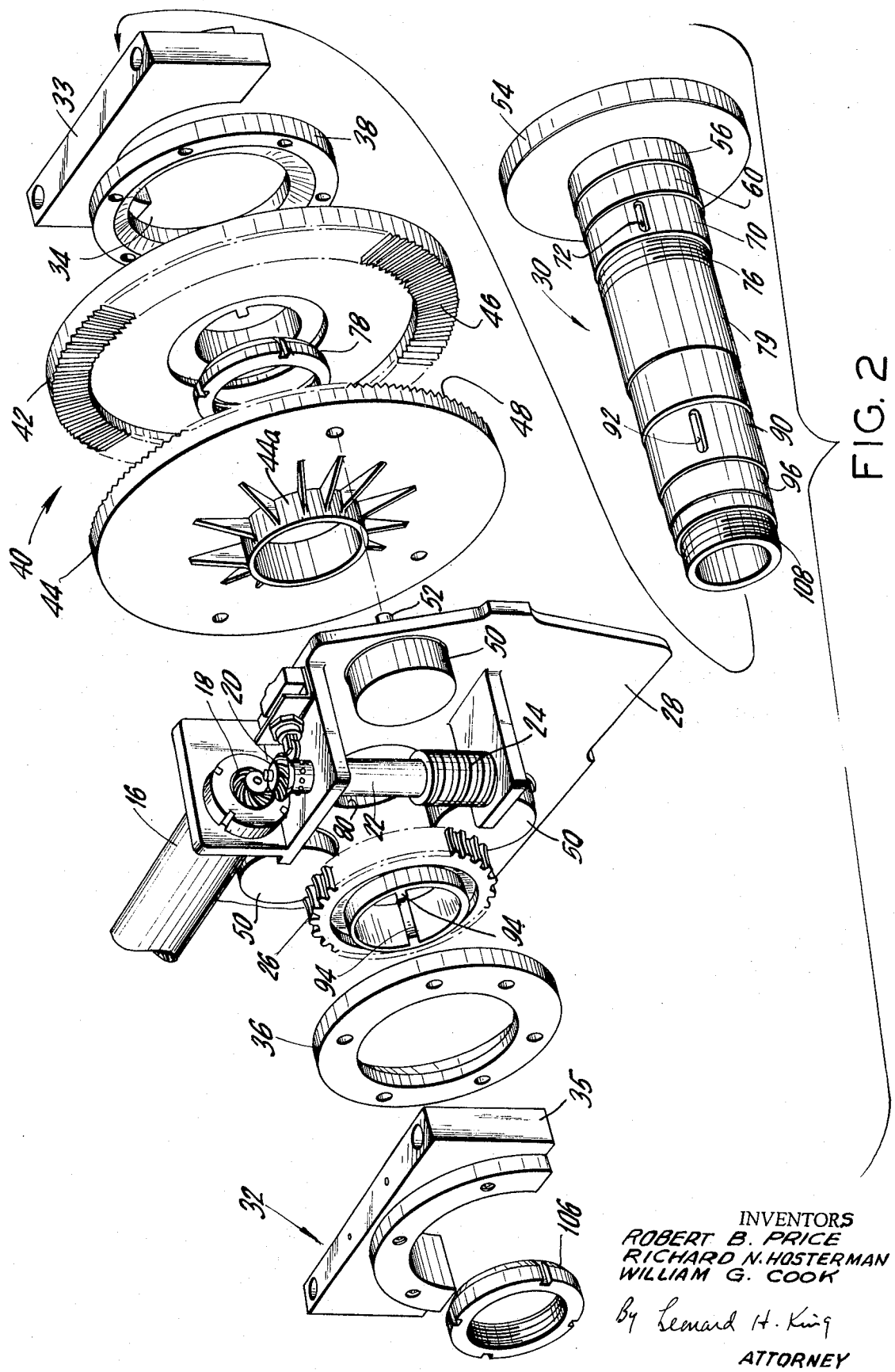

ANGULAR INDEXING APPARATUS FOR A MACHINE TOOL

The aforementioned Abstract is neither intended to define the invention of the application which, of course, is measured by the claims, nor is it intended to be limiting as to the scope of the invention in any way.

This invention relates generally to the machine tool arts and more particularly to an indexing device for angularly displacing a workpiece.

During a manufacturing process, it is often necessary to perform a series of sequential operations on various portions of a workpiece. To accomplish this, means have been provided for accurately indexing the workpiece with respect to the manufacturing tool. A characteristic feature that is common to the prior art presently available is the axial movement of the workpiece during the indexing step. It has long been known that the necessity for axially displacing the workpiece as it is moved from one angular position to another requires a commensuate complexity in the apparatus and may compromise positional accuracy. Although the axial movement required of the indexing apparatus is relatively small, the mechanism thereof must then provide an axial retaining force to restrain the workpiece during the manufacturing operation. Accordingly, the prior art devices were limited in their ability to support the weight of the workpiece and in the cutting forces which could be applied to the workpiece.

In the past, there have been angular indexing attachments or tables that have been used with rotary cycle machines, horizontal boring mills and multiple spindle boring machines, for example. As mentioned above, the common denominator of the prior art utilizing multiple tooth couplings was the axial movement of the workpiece supporting spindle. Indexing has also been achieved in the prior art by the use of a plurality of precision diameter balls on the two mating parts of the indexing apparatus with the balls nested within each other. Still another form of prior art indexing apparatus is a disc having a series of accurately located holes or slots in opposition to another machine member which is adapted to be driven into selected holes or slots. These prior art devices required the use of hand tools to change the angular motion produced at each movement.

The present invention, by way of contrast, eliminates the axial displacement of the spindle and/or the workpiece during the indexing operation. The workpiece is mounted on the face of a rotatable spindle that includes one section of a face tooth coupling which rotates with the spindle. A right angle drive, actuated by a reversible air motor, is arranged to rotate the spindle. The mating section of the coupling is mounted on the spindle in a manner so as to permit axial movement but is fixed to prevent rotation. This coupling section is axially displaceable with respect to the first coupling section by means of pneumatic cylinders.

When the spindle has been indexed to its proper position, the axially slidable coupling section is displaced into engagement with the rotatable coupling section which is thereby radially locked into place. On the shaft supporting the right angle drive there are nine radially extending pins, the positions of which are sensed by an electric switch. Forty revolutions of the shaft thereby correspond to a 360° rotation of the workpiece.

The apparatus is controlled by an electronic circuit which provides a simplified means of changing the desired angular direction. Input to the control circuit is through four thumbwheel switches which correspond to angular position from 0° through 399° and spindle direction. The switch settings produce binary coded output signals which are fed to one input of a dual input ten bit comparator circuit. The other input to the ten bit comparator circuit is then fed from the output of a binary coded decimal counter which counts the pulses produced by the pins actuating the switch. When the two numbers or angles agree, the comparator produces an output which stops the motor.

Because the present invention eliminates the need for axial displacement of the workpiece, improved accuracy is provided. The solid state circuitry used in conjunction with the present invention provides for simplicity, accuracy, and ease of operation.

Accordingly, it is an object of the present invention to provide an improved indexing apparatus for machine tools. Another object of the present invention is to provide indexing apparatus for a workpiece wherein the workpiece is not moved axially.

Another object of the present invention is to provide an improved indexing apparatus as described above, wherein only one of two coupling halves is moved axially while the other half of the coupling is rotatable.

These and other objects, features and advantages of the invention will, in part, be pointed out with particularity and will, in part, become obvious from the following more detailed description of the invention taken in conjunction with the accompanying drawing which forms an integral part thereof.

BRIEF DESCRIPTION OF THE DRAWING

In the various figures of the drawing like reference characters designate like parts.

FIG. 2 is an exploded, perspective view illustrating the major components of the present invention with certain other components omitted for purposes of clarity and ease of description;

DESCRIPTION OF THE PREFERRED EMBODIMENT

Figure 1:
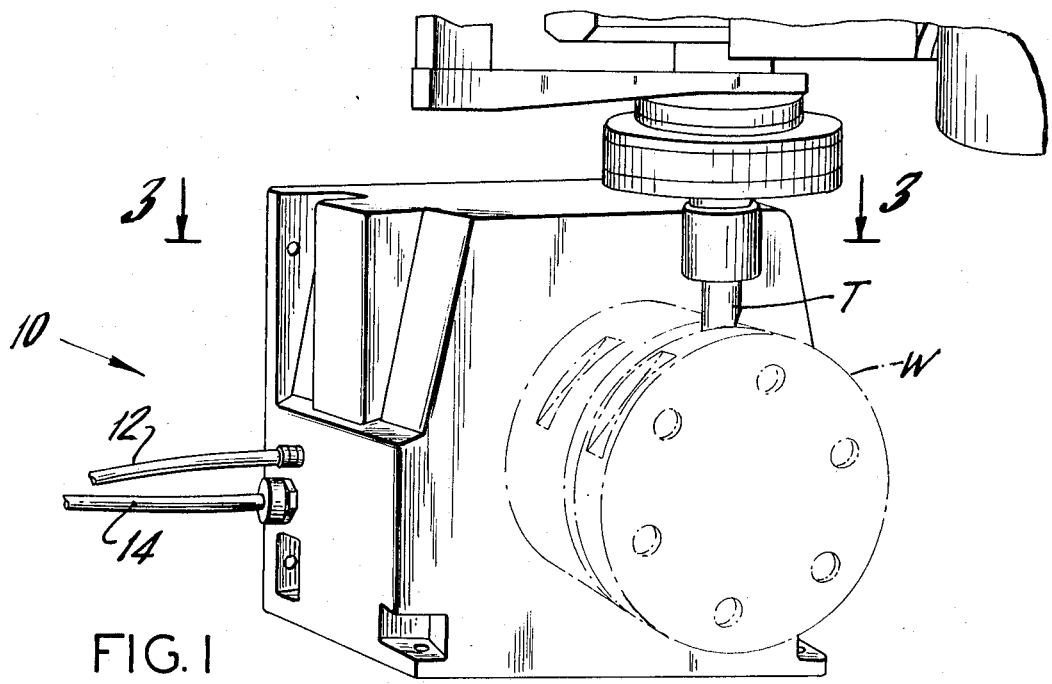
FIG. 1 is a perspective view illustrating the environment of the present invention.

Referring first to FIG. 1, there is shown an embodiment of the present invention in one particular environment. The angular indexing apparatus comprising the present invention is generally designated by the reference character 10 and is constructed such that a workpiece W may be mounted on one end thereof. A tool T is arranged to perform a manufacturing operation on the workpiece W. In the embodiment illustrated the tool T is rotatable in order to perform a metal cutting operation while the workpiece W is angularly indexed by means of the present invention so as to have the various operations performed thereon. Conduit means 12 and 14 provide fluid and electrical power that will be utilized by the angular indexer 10 in a manner to be described more fully hereinafter.

Figure 3:
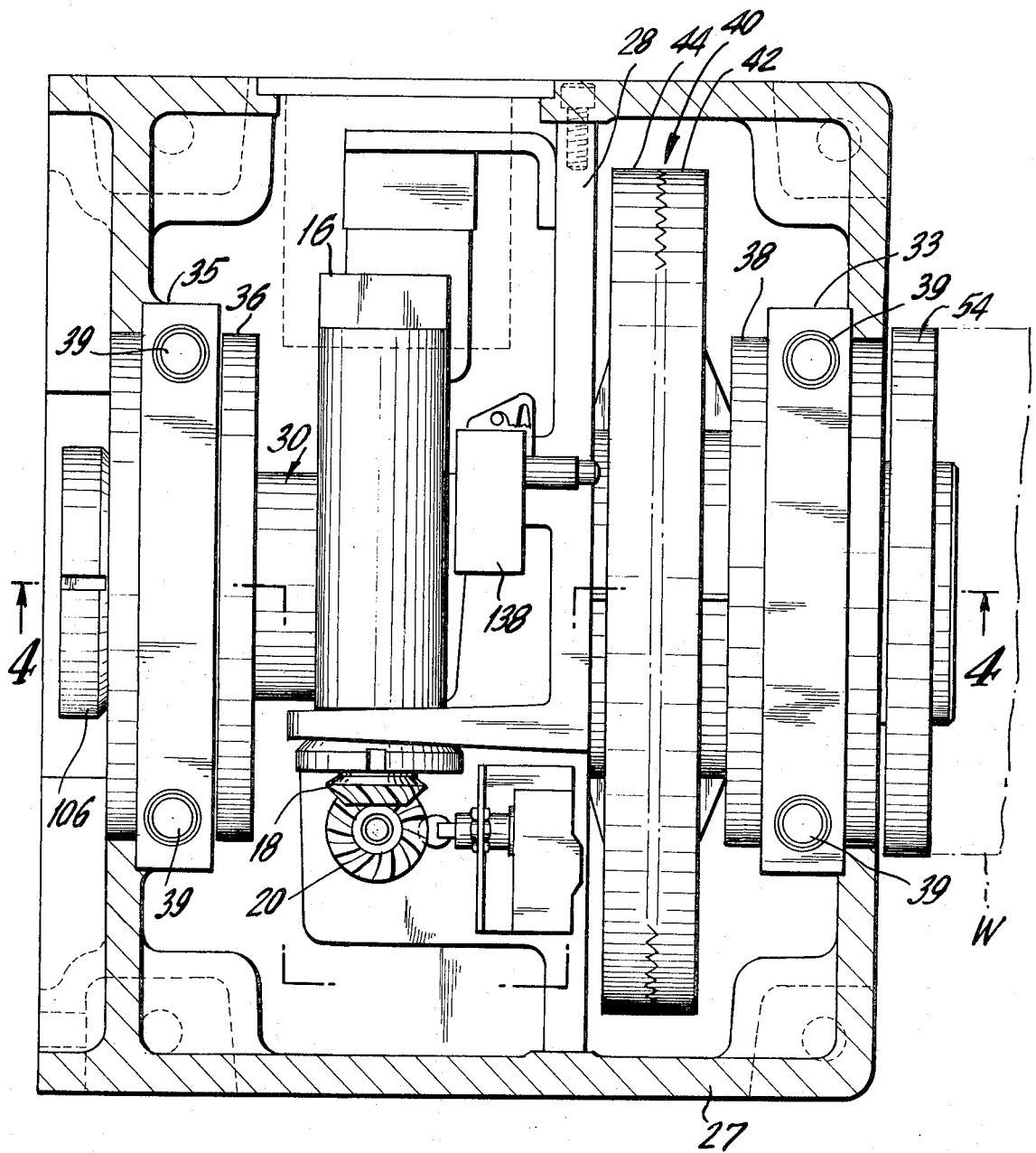
FIG. 3 is a sectional plan view taken along line 3—3 of FIG. 1.

The major components of the angular indexer 10 comprising the present invention are shown in an exploded perspective form in FIG. 2. These components will be described generally with reference to FIG. 2 and more specifically as regards their cooperative relationship, in connection with FIGS. 3, 4 and 5. A fluid motor 16 is arranged to drive a bevel gear 18 that is fixed to the output shaft thereof. A second bevel gear 20, at right angles to and in meshing engagement with the bevel gear 18, is driven thereby. The second bevel gear 20 is mounted on a shaft 22 which in turn supports a worm 24. An annular worm gear 26 is driven by the worm 24. A bracket 28 that is suitably secured to a housing 29 in which the aforementioned components are contained, supports the air motor 16 and the shaft 22.

A spindle, generally designated by the reference character 30, is journaled at opposite ends thereof by bearing means 32 and 34 which are suitably secured to the housing 29 by bearing caps 33 and 35 and clamp rings 36 and 38 which retain the bearing means 32 and 34 respectively. The worm gear 26 is suitably secured to a portion of the spindle 30 in order to impart angular movement thereto. In a manner to be described more fully hereinafter, a face tooth coupling pair 40 is used during the angular displacement of the workpiece W.

The coupling pair 40 is comprised of a first rotatable disc-like section 42 that is suitably secured to the spindle 30 and limited to rotation together therewith and a second nonrotatable disc-like section 44 that is limited to axial movement over a relatively short distance with respect to the spindle 30. The coupling sections 42 and 44 are provided with opposed teeth 46 and 48, respectively, that are formed on the confronting surfaces thereof and which are adapted to mesh with each other when the coupling section 44 is axially displaced in a direction towards the coupling section 42. In the embodiment illustrated, three equally spaced short stroke fluid cylinders 50 having the piston rods 52 thereof secured to the coupling section 44 in order to provide the required axial movement in both directions, are shown.

Still referring to FIG. 2, but with specific reference to the spindle 30, it will be seen that there are provided a plurality of concentric diameters thereon. The workpiece W is adapted to be mounted on the end flange 54 of the spindle 30, in any conventional manner. Diameter 56 is received in a suitably sized, sealed opening 58 in the housing 29. Diameter 60 is sized so as to support the bearing 34 which in turn is mounted within the housing 29 and the bearing cap 33. A clamp ring 38 retains the bearing hanger 33 in cooperation with a plurality of angularly spaced bolts 68 that extend through both the housing 29 and the bearing cap 33 which are secured into the clamp ring 38. Additional bolts 39 pass through the bearing cap 33 and are fastened into the housing 29.

Diameter 70 of the spindle 30 is provided with multiple keyseats 72, that cooperate with keys 74 and the keyways in the rotating coupling section 42 in order to secure the coupling section 42 to the spindle 30 for rotation together therewith. A threaded portion 76 of the spindle has a locknut 78 mounted thereon so as to axially retain the coupling section 42 and the bearing 34. The axially movable coupling section 44 is provided with a cylindrical hub 44a which is adapted to slide axially on the diameter 79 of the spindle 30. In connection with the axially movable coupling section 44, it should be noted that the support bracket 28 is provided with a central bore 80 through which the hub 44a is adapted to pass. The central bore 80 and the outside diameter of the hub 44a are dimensioned with respect to each other in order to assure a free sliding fit. The coupling section 44 is axially displaced by means of the cylinders 50 that are shown best in FIGS. 2 and 4. Three hardened bushings 84 are rigidly secured in the bracket 28 and receive the piston rods 52 of the cylinders 50. The end portion of each of the piston rods 52 is closely fitted and suitably secured by bolts 88 in appropriately sized openings formed in the central portion of the rotationally fixed coupling section 44. Thus, as will be described hereinafter, the cylinders 50 are arranged to axially displace the rotationally fixed coupling section 44 so that the teeth 48 thereof meshingly engage and disengage the teeth 46 of the axially fixed but rotatable coupling section 42.

Figure 4:
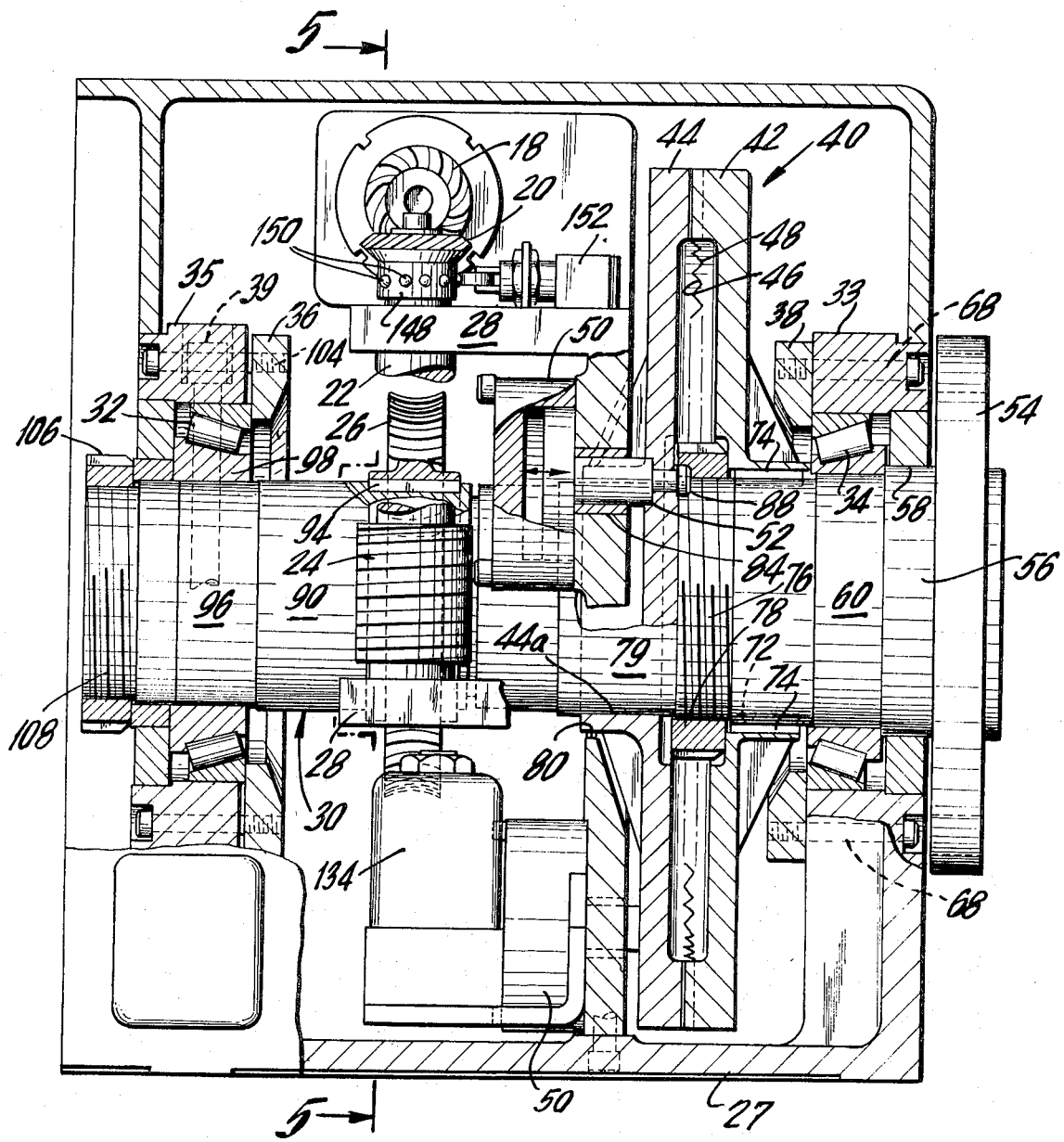
FIG. 4 is a sectional elevational view taken along line 4—4 of FIG. 3.
Figure 5:
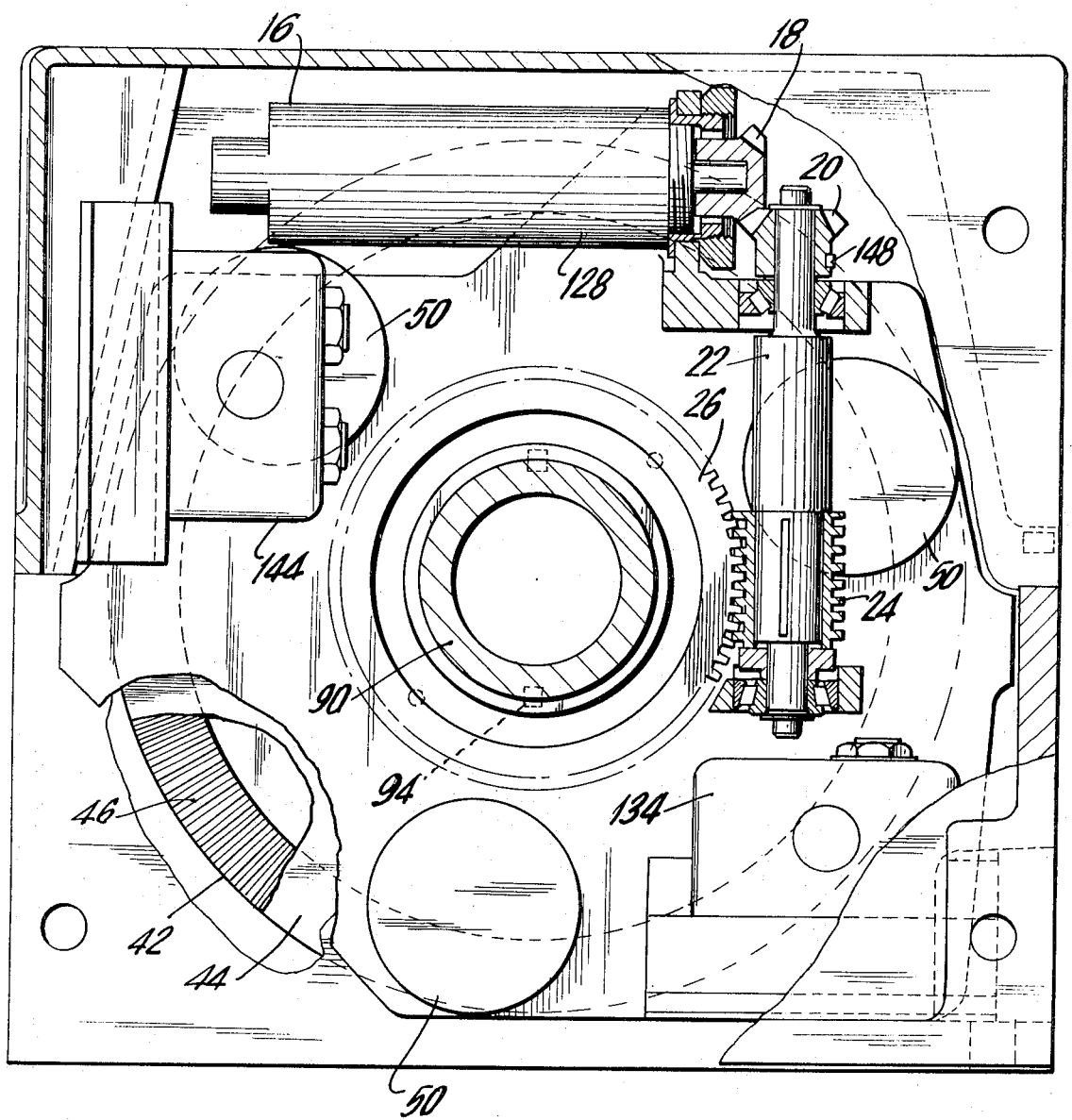
FIG. 5 is a sectional end elevational view taken along line 5—5 of FIG. 4.

As shown for example in FIG. 4, the worm gear 26 is secured to diameter 90 of the spindle 30 by means of two keyseats 92 formed therein and keys 94 that cooperate with the keyways 92 in the worm gear hub.

Diameter 96 of the spindle 30 is used to support the bearing 32 which, in turn, is mounted in the bearing cap 35 that is affixed to an end wall of the housing 29. The clamp ring 36 is secured to the bearing cap 35 and housing 29 by means of screws 104 in order to retain the bearing 32. Additional bolts 39 pass through the bearing cap 35 and are fastened into the housing 29. A lock nut 106 is mounted on the threaded diameter 108 of the spindle 30 in order to axially secure the spindle 30 with respect to the housing 29. Additionally, the lock nut 106 is used to preload the bearings 32 and 34 to further secure the spindle against axial forces imposed on the spindle during use.

MODE OF OPERATION

Figure 6:
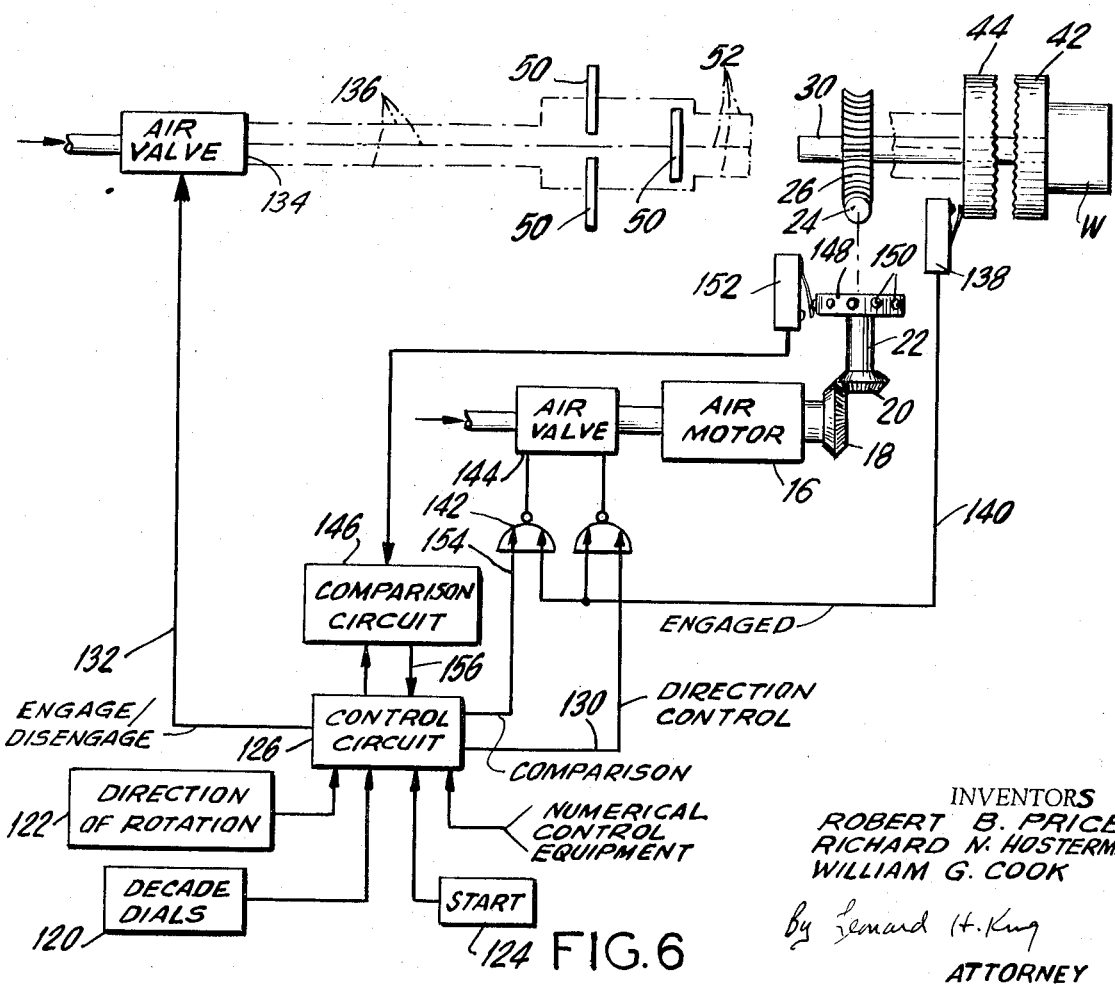
FIG. 6 is a schematic, block diagram illustrating one embodiment of the circuitry that may be used with the present invention.

FIG. 6 is a block diagram of an electrical control for the apparatus comprising this invention. The operation of the apparatus is initiated by setting the extent of the desired angle of rotation on externally located thumbwheel decade switch dials 120 and the direction of rotation of the workpiece W on a control switch 122. A start button 124 is then displaced. The signal from the workpiece rotation control switch 122 is sent by a control circuit 126 to the bi-directional air motor 16 on a line 130. The control circuit 126 also sends a disengage signal on a line 132 to an air valve 134 thereby sending pressurized air from a suitable source not shown to the three pancake air cylinders 50 by means of conduits 136. Since the pistons 52 of the air cylinders 50 are directly connected to the coupling section 44, the air valve 134 thus causes the coupling section 44 to move axially along the spindle 30 and thereby disengage itself from the non-axially but rotatably movable coupling section 42. When the coupling section 44 is disengaged, it hits a switch 138 which stops the engaged signal on a line 140 through a NOR gate 142 connected to an air valve 144 thereby permitting the air motor to rotate in the controlled direction.

The extent of the angle of rotation set on the dials 120 is encoded by the control circuit 126 and sent to a comparison circuit 146. As the output shaft of the air motor 16 rotates, it drives the spindle 30 through the worm and worm wheel set 24, 26 and also rotates the shaft 22 through the right angle bevel gears 18 and 20. Integral with the shaft 22 and the bevel gear 20 is a ring 148 having nine radially outward extending pins 150 that engage a switch 152 as they rotate thereby. The bevel gears 18 and 20 are arranged so that the shaft 22 turns forty times with each complete rotation of the output shaft of the air motor 16. Since there are nine pins or projections 150 that engage the switch 152 for each revolution of the shaft 22, there will be 360 pulses from the switch 152 with each revolution of the shaft of the air motor 16. The decade dials 120 can therefore be indexed in one degree increments. Pulses from the switch 152 are also supplied to the comparison circuit 146.

When the comparison circuit 146 detects no difference between the angle set on the dials 120 and the angular displacement of the output shaft of the air motor 16, it sends a signal on a line 156 to the control circuit which reverses the air valve 144 thereby reversing the air motor 16. It also sends an engage signal on a line 132 to the air valve 134 causing the three pancake cylinders 50 to move the coupling section 44 in an axial direction into meshing engagement with the coupling section 42. As the coupling section 44 moves axially away from the switch 138, an engage signal is sent on the line 140 to the air valve 142, causing the motor to stop. This action ensures that the air motor 16 will not operate as long as the coupling section 44 is axially displaced from its endmost position.

The control circuit 126 could, for example, include a decimal to binary converter and the comparison circuit 146 could, for example, include a shift register with the pulses from the switch 152 being used to shift the value stored by the control circuit 126 until the register is empty, at which time it produces an output. Alternatively, the control circuit may be in the form of a voltage divider which fixes a voltage and the comparison circuit 146 could be in the form of a voltage threshold detector. The pulses from the switch 152 can be converted into a voltage and, as soon as this voltage exceeds the predetermined value set on the dials 120, an output is produced. These and other functionally similar circuits are well known in the art. Further, instead of manually providing the preliminary dial settings, the control circuit 126 could be automatically encoded for continuous operation. In addition, the disengage pulse on the line 132 could be manually provided at the output panel through the control circuit 126.

There has been disclosed heretofore the best embodiment of the invention presently contemplated. However, it is to be understood that various changes and modifications may be made by those skilled in the art without departing from the spirit of the invention.

We claim:

1. Angular indexing means for a workpiece said angular indexing means comprising:
   a. a rotatably journaled spindle for supporting the workpiece;
   b. coupling means mounted on said spindle, said coupling means including a first section that is limited to rotational movement together with said spindle and a second section that is limited to axial movement with respect to said spindle whereby said second section is arranged to move into and out of engagement with said first section;
   c. drive means for rotating said spindle said drive means being limited only to rotational movement;
   d. displacement means for moving said second coupling means section in an axial direction without axially displacing said spindle whereby, during engagement of said first and said second coupling means sections, said spindle is prevented from rotating, said displacement means comprising displacement means for moving said second coupling mean section in an axial direction without axially displacing said spindle whereby, during engagement of said first and said second coupling means sections, said spindle is prevented from rotating said displacement means comprising short stroke fluid powered cylinder means including piston means rigidly secured to said second coupling means section and arranged for movement in a direction that is substantially parallel to the longitudinal axis of said spindle.

2. The angular indexing means in accordance with claim 1 wherein said first and second coupling means sections are comprised of a pair of discs positioned in planes substantially perpendicular to the longitudinal axis of said spindle, each said disc having a plurality of radially extending teeth formed on the confronting faces thereof.

3. The angular indexing means in accordance with claim 1 wherein said drive means comprises an air motor and a gear train for coupling the output shaft of said air motor to said spindle.

4. The angular indexing means in accordance with claim 3 wherein said gear train comprises a first bevel gear rigidly secured to the output shaft of said air motor, a second bevel gear in meshing engagement with said first bevel gear, a shaft for supporting said second bevel gear on an axis that is perpendicular to the axis of said first bevel gear, a worm gear mounted on said shaft for rotation together therewith and a worm wheel rigidly secured to said spindle and in meshing engagement with said worm gear.

5. The angular indexing means in accordance with claim 1 wherein said circuit means comprises:
   a. input means for setting the angle of indexing;
   b. means for detecting the actual angle through which said spindle rotates; and
   c. means for comparing the angle set with the actual angle detected and for producing a comparison signal when the two angles are equal, said drive means being responsive to said comparison signal for stopping the rotation of said spindle.

6. The angular indexing means in accordance with claim 5 wherein said circuit means further comprises means for preventing drive means from rotating said spindle when said second coupling means section is engaged.

7. The angular indexing means in accordance with claim 6 wherein said preventing means comprises a switch means for producing a disengage signal when said second coupling means section is disengaged.

8. The angular indexing means in accordance with claim 7 wherein said preventing means is actuated either by an absence of said disengage signal or the presence of said comparison signal.

9. The angular indexing means in accordance with claim 5 wherein said detecting means comprises pulsing means coupled to said drive means and arranged to rotate therewith for producing a continuous sequence of pulses representative of the actual angle.

10. The angular indexing means in accordance with claim 9 wherein said pulsing means comprises a ring-like member rotated by said drive means and having a plurality of projections extending radially therefrom and switch means positioned so as to be actuated by successive ones of said projections during the rotation thereof whereby a pulse is produced as a result of each said engagement.

11. The angular indexing means in accordance with claim 5 wherein said input means comprises a plurality of decade dials.

12. The angular indexing means in accordance with claim 11 wherein said input means further comprises encoding means for converting a value set on said decade dials into an electrical signal.

13. The angular indexing means in accordance with claim 5 wherein said input means further comprises direction control means coupled to said drive means for controlling the direction of rotation of said spindle.

14. The angular indexing means in accordance with claim 5 and wherein said displacement means is responsive to said comparison signal for moving said second coupling means section into engagement with said first coupling means section.

15. The angular indexing means in accordance with claim 5 wherein said input means further comprises means adapted to be controlled by numerical control equipment.

16. The angular indexing means in accordance with claim 5 wherein said input means further comprises start means for producing a first signal for causing said displacement means to disengage said first and said second coupling means sections and a second signal for causing said drive means to rotate said spindle.

* * * * *